(12) United States Patent
Park et al.

(10) Patent No.: US 7,593,420 B2
(45) Date of Patent: Sep. 22, 2009

(54) METHOD FOR ALLOCATING RESOURCES IN A MULTICARRIER SYSTEM AND TRANSMISSION APPARATUS USING THE SAME

(75) Inventors: Seung-Young Park, Seoul (KR); Yeon-Woo Lee, Seongnam-si (KR); Sang-Boh Yun, Seongnam-si (KR); Yung-Soo Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 650 days.

(21) Appl. No.: 11/286,728

(22) Filed: Nov. 25, 2005

(65) Prior Publication Data

US 2006/0109865 A1 May 25, 2006

(30) Foreign Application Priority Data

Nov. 24, 2004 (KR) ...................... 10-2004-0097135

(51) Int. Cl.
*H04J 4/00* (2006.01)
(52) U.S. Cl. ...................................... 370/436; 370/468
(58) Field of Classification Search ................. 370/208, 370/319, 344, 203, 341, 431, 436, 437, 329, 370/464, 468, 485; 455/440, 422.1, 63.3, 455/67.13
See application file for complete search history.

(56) References Cited

U.S. PATENT DOCUMENTS

| 4,144,496 | A | | 3/1979 | Cunningham et al. |
| 5,073,971 | A | * | 12/1991 | Schaeffer ..................... 455/447 |
| 5,276,907 | A | * | 1/1994 | Meidan ...................... 455/436 |
| 7,062,276 | B2 | * | 6/2006 | Xu et al. ..................... 455/450 |
| 7,372,913 | B2 | * | 5/2008 | van Zelst et al. ............ 375/267 |
| 2003/0211831 | A1 | * | 11/2003 | Xu et al. .................... 455/63.3 |

FOREIGN PATENT DOCUMENTS

| WO | WO 02/43278 | 5/2002 |
| WO | WO 02/49385 | 6/2002 |
| WO | WO 03/045081 | 5/2003 |

* cited by examiner

*Primary Examiner*—Brenda Pham
(74) *Attorney, Agent, or Firm*—The Farrell Law Firm, LLP

(57) ABSTRACT

In an orthogonal frequency division multiplexing (OFDM) mobile communication system, an apparatus and method allocates resources for data transmission and transmits/receives user data using the allocated resources. A full subcarrier band allocable for one cell is divided into a plurality of subcarrier regions. Subcarriers selected from subcarriers existing in one of the plurality of subcarrier regions are allocated for each of a plurality of sectors constituting the cell. The subcarriers are allocated such that subcarriers existing in different subcarrier regions are allocated for neighboring sectors in the cell.

16 Claims, 12 Drawing Sheets

METHOD FOR ALLOCATING RESOURCES IN A MULTICARRIER SYSTEM AND TRANSMISSION APPARATUS USING THE SAME

PRIORITY

This application claims the benefit under 35 U.S.C. § 119(a) of an application entitled "Method for Allocating Resources in a Multicarrier System and Transmission Apparatus Using the Same" filed in the Korean Intellectual Property Office on Nov. 24, 2004 and assigned Serial No. 2004-97135, the entire contents of which are incorporated herein by reference.

BACKGROUND OF THE INVENTION

1. Field of the Invention

The present invention relates generally to a communication system using an Orthogonal Frequency Division Multiple Access (OFDMA) scheme (hereafter referred to as an "OFDMA communication system"), and in particular, to a method for allocating resources for data transmission and an apparatus for transmitting and receiving data using the allocated resources.

2. Description of the Related Art

An Orthogonal Frequency Division Multiplexing (OFDM) scheme can be defined as a two-dimensional access scheme obtained by combining time division access technology and frequency division access technology. An OFDM symbol generated by the OFDM scheme is carried by a plurality of subcarriers after being divided, and the subcarriers are grouped into a subchannel before being transmitted.

The OFDM scheme, in which subchannel spectra overlap each other while maintaining mutual orthogonality, has high spectrum efficiency, and because OFDM modulation and demodulation is performed by Inverse Fast Fourier Transform (IFFT) and Fast Fourier Transform (FFT), a modulation/demodulation block can be subject to efficient digital implementation. In addition, the OFDM scheme, which is robust against frequency selective fading or narrowband interference, is efficient for transmitting high-speed data, and has now been adopted as a standard for transmission of European digital broadcasting and for high-capacity wireless communication systems such as IEEE 802.11a, IEEE 802.16a, and IEEE 802.16b communication systems.

The OFDM scheme is a kind of Multi-Carrier Modulation (MCM) scheme. The MCM scheme converts a serial input symbol stream into parallel symbol streams and modulates the individual symbol streams with a plurality of orthogonal subcarriers (or subchannels) before transmission. The MCM scheme was first applied to military high-frequency radio communications, and has developed into a scheme for overlapping a plurality of orthogonal subcarriers.

However, the OFDM scheme had a limitation in being actually applied to a system because it should be able to implement orthogonal modulation between multiple subcarriers. Thereafter, the rapid progress of technical development of the OFDM scheme was triggered by the announcement of a Discrete Fourier Transform (DFT) technique that can efficiently perform the OFDM modulation and demodulation. In addition, the use of a guard interval and the insertion of a cyclic prefix (CP) into the guard interval have reduced the defects of the system caused by multipath propagation and delay spread.

Therefore, the OFDM scheme is now widely being applied to such digital transmission technologies as digital audio broadcasting (DAB), digital television (DTV), wireless local area network (W-LAN), and wireless asynchronous transfer mode (W-ATM). That is, the OFDM scheme, which was not widely used due to its hardware complexity, can now be implemented because of the recent developments in the various digital signal processing technologies including FFT and IFFT.

The OFDM scheme, being similar to the conventional frequency division multiplexing (FDM) scheme, is characterized by transmitting a plurality of subcarriers while maintaining orthogonality therebetween, thereby obtaining the optimal transmission efficiency during high-speed data transmission. In addition, the OFDM scheme has high frequency efficiency and is robust against multipath fading, so it can obtain the optimal transmission efficiency during high-speed data transmission. Because the OFDM scheme overlaps frequency spectrums, it has high frequency efficiency and is robust against frequency selective fading and multipath fading. In addition, the OFDM scheme can reduce inter-symbol interference (ISI) with the use of a guard interval. Moreover, the OFDM scheme enables a simple hardware design of an equalizer. Further, the OFDM scheme is robust against impulse noises. Therefore, the OFDM scheme is now widely being applied to the communication system.

An Orthogonal Frequency Division Multiple Access (OFDMA) scheme is a multiple access scheme based on the OFDM scheme. In the OFDMA scheme, a plurality of users, i.e., a plurality of terminals, individually use subcarriers in one OFDM symbol.

A mobile communication system using the foregoing conventional OFDM scheme fixes time and frequency channels allocated to users like OFDM-Time Division Multiple Access (TDMA) or OFDM-Frequency Division Multiple Access (FDMA) in a cellular mobile communication system. That is, the OFDM scheme means that users using OFDM and multiple access technologies in one cell perform TDMA or FDMA transmission. Therefore, in order to increase frequency efficiency, the same frequency bands are reused by a plurality of cells.

A degree of the frequency reuse is determined by a frequency reuse factor. Commonly, the frequency reuse factor is fixed to 3, 4 and 7, so frequency reuse efficiency is not so high (frequency reuse factor is greater than 1) due to the fixed channel allocation technologies, and allocation of fixed subchannels leads to a high bit error rate (BER) due to frequency selective fading channels.

Therefore, broadband wireless access (BWA) technologies based on a method of balancing interferences (interference balancing technology) have been proposed. Band Division Multiple Access (BDMA) technology and Multi-carrier Code Division Multiple Access (MCDMA) technology are typical examples of the interference balancing technology. Herein, interference balancing is achieved by a diversity effect of interference occurring due to intercell random frequency hopping and spread spectrum technologies.

The interference balancing technology can show better performance, compared with the fixed channel allocation technology. However, the interference balancing technology cannot perfectly accomplish advantages of multicarrier modulation such as multiuser diversity and adaptive resource allocation with channel information in base stations (BSs).

To address such problems, interference avoiding technology such as dynamic channel allocation has been proposed. The interference avoiding technology can be two or three times higher than the interference balancing technology in terms of frequency utility. Therefore, combination of OFDM and multiantenna technologies and dynamic subchannel allocation technology based on adaptive modulation and low-complexity interference avoiding technology noticeably reduces the influence of deep fading and co-channel interference (CCI), thereby increasing frequency efficiency and system capacity.

A frequency hopping (FH) scheme, which is a scheme for dynamically changing subcarriers allocated to a particular terminal, is a typical example of the foregoing interference avoiding technology. An FH-OFDMA scheme is obtained by combining the FH scheme and the OFDMA scheme. A communication system using the FH-OFDMA scheme (hereinafter referred to as an "FH-OFDMA communication system") enables a frequency band of subcarriers allocated to terminals to hop at predetermined intervals. That is, the FH-OFDMA communication system also attempts to acquire frequency diversity gain by distributing all of the subcarriers, i.e., data subcarriers over the full frequency band.

In a cellular system based on the FH-OFDMA scheme, every cell or sector balances interference from a neighboring cell or sector using an independent subcarrier allocation pattern. Such a technique is different in interference characteristics from the interference balancing technology for a CDMA scheme in which transmission signals exist in the same frequency band and spreading/despreading is performed through codes because the FH-OFDMA system uses only a part of a frequency band, unlike the CDMA system that uses all of a particular frequency band. Therefore, if a particular subcarrier is used even in a neighboring cell, the FH-OFDMA system suffers severe performance degradation in an uplink, compared with the CDMA system.

In addition, the CDMA system allocates the same frequency band to each sector. In this case, the influence of interference can be reduced by balancing the interference by spreading/despreading of codes. If this is applied to the OFDMA system, performance degradation occurs in a location where neighboring sectors or neighboring cells use the same subcarrier. The performance degradation is severe, especially for the uplink. In order to solve this problem, there is a need for a cell structure having a new concept being different from the sectorization concept used in the conventional CDMA system.

In order to propose the new cell structure, an efficient resource allocation scheme for each cell or sectors constituting each cell should be taken into consideration along with mobility of terminals. Herein, the efficient resource allocation means high frequency efficiency, i.e., a frequency reuse factor approximating 1. It is common that closer the frequency reuse factor is to 1, the higher the frequency efficiency is.

SUMMARY OF THE INVENTION

It is, therefore, an object of the present invention to provide a sectorization method for dividing a cell in order to minimize possible interference occurring in an OFDM/OFDMA system.

It is another object of the present invention to provide a resource allocation method for increasing a frequency reuse factor in an OFDM/OFDMA system.

It is further another object of the present invention to provide a resource allocation method for minimizing interference between an uplink and a downlink in an OFDM/OFDMA system.

It is yet another object of the present invention to provide a method for performing resource allocation on an uplink and resource allocation on a downlink in a different manner to minimize interference between the uplink and the downlink in an OFDM/OFDMA system.

It is still another object of the present invention to provide a method for dividing sectors constituting one cell into subsectors and allocating resources to the individual subsectors in an OFDM/OFDMA system.

It is still another object of the present invention to provide a method for dividing an allocable subcarrier band into a plurality of subcarrier groups and allocating resources according to the divided subcarrier groups in an OFDM/OFDMA system.

It is still another object of the present invention to provide a method for dividing sectors included in one cell into a plurality of subsectors using a plurality of antennas in an OFDM/OFDMA system.

It is still another object of the present invention to provide a method for dividing sectors included in one cell into a plurality of subsectors and distributing loads to the individual subsectors in an OFDM/OFDMA system.

It is still another object of the present invention to provide a method for redistributing resources between beams formed in individual sectors in a mobile communication system that uses a narrowband beam pattern.

It is sill another object of the present invention to provide a method for achieving efficient resource allocation in a Space Division Multiple Access (SDMA) system.

According to one aspect of the present invention, there is provided a method for allocating resources in an orthogonal frequency division multiplexing (OFDM) mobile communication system. The method includes the steps of: dividing a full subcarrier band allocable for one cell into a plurality of subcarrier regions; allocating subcarriers selected from subcarriers existing in one of the plurality of subcarrier regions for each of a plurality of sectors included in the cell; and allocating the subcarriers such that subcarriers existing in different subcarrier regions are allocated for neighboring sectors in the cell.

According to another aspect of the present invention, there is provided a method for allocating resources for individual sectors in an orthogonal frequency division multiplexing (OFDM) mobile communication system. The method includes the steps of: dividing a full subcarrier band into a first subcarrier region and a second subcarrier region having a same size; allocating subcarriers selected from the first subcarrier region based on a first subcarrier allocation pattern as downlink resources for sectors in a first service zone among a plurality of sectors included in one cell; and allocating subcarriers selected from the second subcarrier region based on a second subcarrier allocation pattern as downlink resources for sectors in a second service zone. The cell includes a predetermined number of sectors, the predetermined number is a multiple of 2 and is greater than or equal to 6, and the sectors in the first service zone neighbor the sectors in the second service zone.

According to further another aspect of the present invention, there is provided a transmission apparatus in an orthogonal frequency division multiplexing (OFDM) mobile communication system for transmitting user data for individual sectors. The apparatus includes a subcarrier allocator for dividing a full subcarrier band into a first subcarrier region and a second subcarrier region having the same size, allocating subcarriers selected from the first subcarrier region based on a first subcarrier allocation pattern as downlink resources for sectors in a first service zone, and allocating subcarriers selected from the second subcarrier region based on a second subcarrier allocation pattern as downlink resources for sectors in a second service zone; mappers for receiving user data to be transmitted for the individual sectors, and mapping the user data to the subcarriers corresponding to the downlink resources allocated for the individual sectors; inverse fast Fourier transform (IFFT) blocks for transforming the user data mapped to the individual subcarriers into time-domain user signals; and guard interval inserters for inserting a guard interval into each of the time-domain user signals, and transmitting the guard interval-inserted user signals via transmission antennas associated with the individual sectors. The sectors in the first service zone include non-neighboring sectors among the sectors, and the sectors in the second service zone include the remaining sectors except for the sectors in the first service zone.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF EXEMPLARY EMBODIMENTS

Several exemplary embodiments of the present invention will now be described in detail with reference to the annexed drawings. In the following description, a detailed description of known functions and configurations incorporated herein has been omitted for clarity and conciseness.

In the following description, the present invention will propose a new cell structure for efficient resource allocation. In the new cell structure, the present invention proposes different resource allocation schemes separately for a downlink and an uplink. In addition, in order to prevent loads from being concentrated on a particular subsector, the present invention proposes a load balancing scheme for balancing loads of the individual subsectors. In the following description, resource allocation for the down link and the uplink will be limited to subcarrier allocation. However, the resource allocation proposed in the present invention is not necessarily limited only to subcarrier allocation. That is, it would be obvious to those skilled in the art that the present invention can be applied to every cellular network that uses radio resources, including subcarriers.

A. Exemplary Implementation for Downlink

In the following description, a sectorization scheme for a downlink and a downlink resource allocation scheme according thereto will be described in detail. In addition, a downlink resource allocation scheme proposed in the present invention and an operation of a transmission apparatus for transmitting data using the downlink resource allocation scheme will be described in detail.

A-1. Sectorization and Resource Allocation Scheme for Downlink

Figure 1:
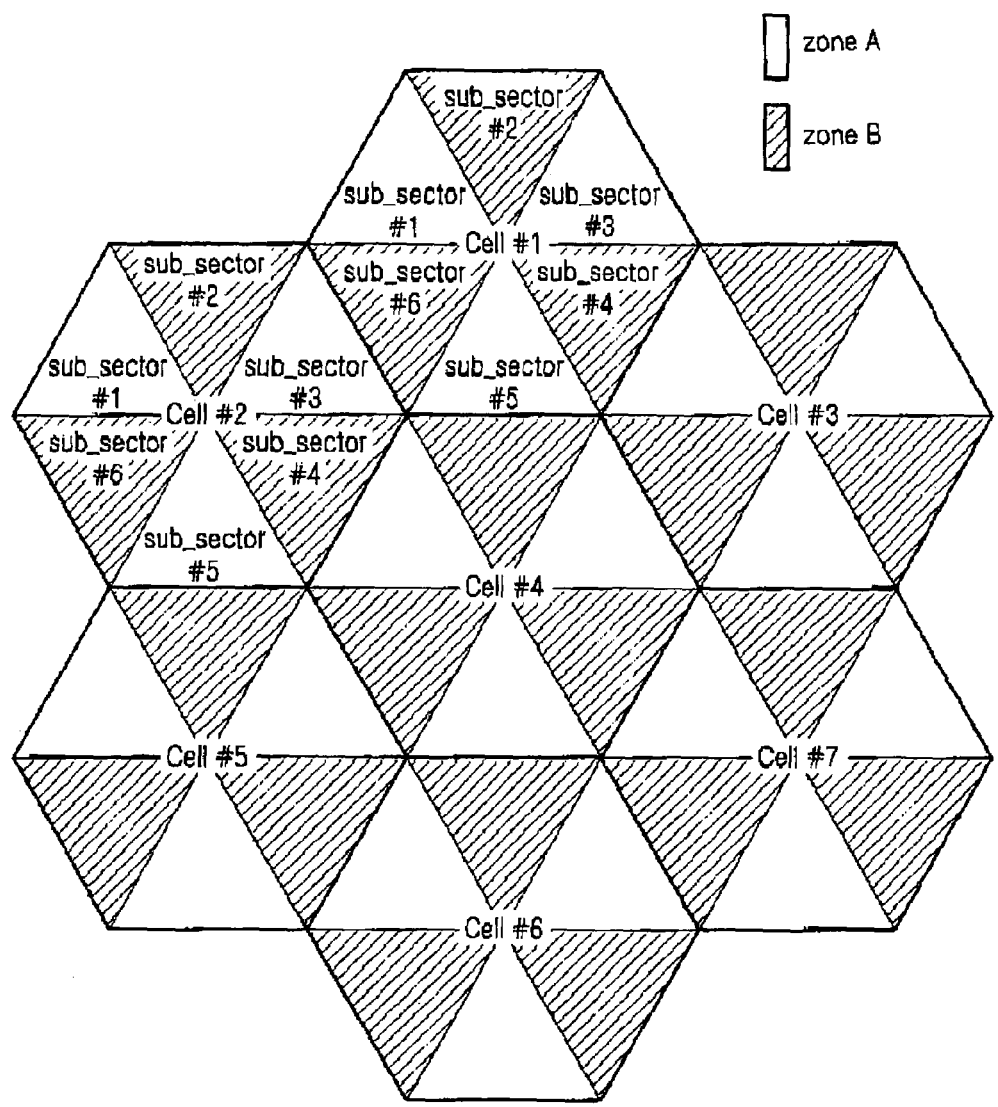
FIG. 1 is a diagram illustrating an exemplary cell structure proposed in the present invention, and downlink resources allocated for the cell structure.

Commonly, one cell is comprised of three sectors. The present invention proposes a method for dividing each of these sectors into a plurality of subsectors. In the following detailed description of a preferred embodiment, the present invention will divide one cell into a total of six subsectors by dividing each individual sector into two subsectors. This division is illustrated in FIG. 1.

However, it should be noted that the present invention is not limited to the cell structure comprised of six subsectors. That is, the present invention can be applied in the same way to every cell structure in which one cell is comprised of a predetermined number of subsectors, the number being greater than six and a multiple of 2.

Although the term "subsector" will be used herein for convenience of description, it will be construed that this has the same meaning as the term "sector" used previously. In other words, the subsector can be distinguished in a physical concept like the existing sector, or can be distinguished by two antenna beams within one physical sector. In order to distinguish the subsector in the physical concept, it is necessary to divide one cell into six sectors and allocate one antenna beam to each individual sector. Otherwise, it is necessary to divide one cell into three sectors and allocate two antenna beams to each individual sector. However, there is no difference in structure between the two cases to which the present invention is applied.

Again, in the following detailed description, it will be assumed that each cell is comprised of three sectors and each of the sectors is divided into two subsectors. As described above, however, it would be obvious to those skilled in the art that the present invention can be applied in the same way even to the case where one cell is divided into six sectors.

In addition, the present invention divides a full subcarrier band used in an OFDM/OFDMA system into two subcarrier regions having the same size. The two subcarrier regions will be called a "first subcarrier region" and a "second subcarrier region." Downlink resources can be allocated to each individual subsector from any one of the first subcarrier region and the second subcarrier region. For example, the subsectors are divided into subsectors allocated resources from the first subcarrier region and subsectors allocated resources from the second subcarrier region. Resources from the same subcarrier region should not be allocated to neighboring subsectors. This allocates resources from different subcarrier regions to the neighboring subsectors, thereby minimizing interference therebetween.

Compared with the conventional OFDM/OFDMA system that selects subcarriers from the full subcarrier region and configures a subchannel with the selected subcarriers, the present invention selects subcarriers from a subcarrier region corresponding to ½ of the full subcarrier region and configures a subchannel with the selected subcarriers for each individual service zone. Selecting subchannels to configure a subchannel is a technique known to those skilled in the art, so a detailed description thereof will be omitted herein for simplicity.

FIG. 1 is a diagram illustrating an exemplary cell structure proposed in the present invention, and downlink resources allocated for the cell structure. It is assumed in FIG. 1 that cells have an ideal type and the number of the cells is limited to seven.

As illustrated in FIG. 1, sectors constituting each individual cell are divided into a plurality of zones, e.g., zones A and B. The zones divided from the sectors become subsectors. Therefore, when one sector is divided into two zones, each cell is comprised of six subsectors.

In FIG. 1, one of the two subsectors included in a sector is hatched, and another is not hatched, because downlink resources allocated to the individual subsectors are divided into two types. In the drawing, the downlink resources can be divided into downlink resources allocated to non-hatched subsectors denoted by 'zone A' (hereinafter referred to as a "first service zone") and downlink resources allocated to hatched subsectors denoted by 'zone B' (hereinafter referred to as a "second service zone"). As a result, orthogonal downlink resources are allocated to the neighboring subsectors in the same cell. Herein, the term "orthogonal" indicates that there is no interference between the downlink resources.

In addition, interference between the neighboring cells should also be considered when allocating the downlink resources. It can be noted in FIG. 1 that the hatched subsectors, i.e., those in zone B, take the interference between the neighboring cells into consideration. For example, for a subsector #6 of a cell #1 and a subsector #3 of a cell #2, both located in a boundary between the cell #1 and the cell #2, the downlink resources should be allocated taking orthogonality into consideration. Therefore, the subsector #6 of the cell #1 is hatched but the subsector #3 of the cell #2 is not hatched. That is, the subsector #6 of the cell #1 belongs to the second service zone and the subsector #3 of the cell #2 belongs to the first service zone.

Figure 2:
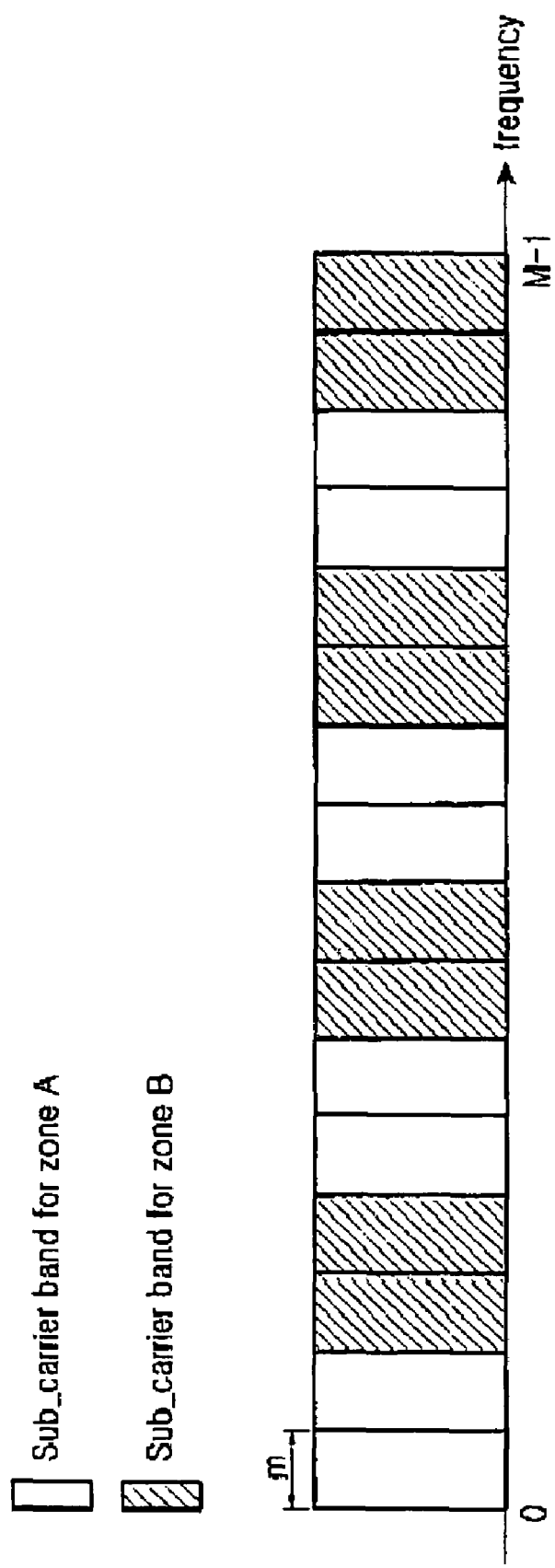
FIG. 2 is a diagram illustrating an exemplary method for distributing downlink resources for the cell structure illustrated in FIG. 1.

FIG. 2 is a diagram illustrating an exemplary method for distributing downlink resources for the cell structure illustrated in FIG. 1. Referring to FIG. 2, the full subcarrier bandwidth used in the OFDM/OFDMA system is divided into a plurality of intervals having a predetermined bandwidth. It is assumed herein that the full subcarrier bandwidth includes M subcarriers and the predetermined bandwidth indicates an interval including m subcarriers. In FIG. 2, the full subcarrier band is divided into 16 intervals, by way of example. However, it would be obvious to those skilled in the art that the present invention can be applied in the same way to any subcarrier band structure in which the full subcarrier band is divided into a predetermined number of intervals, the number being a multiple of 2, other than sixteen.

The 16 intervals are divided into two subcarrier regions having the same bandwidth of m×8. These will be called a "first subcarrier region" and a "second subcarrier region." In FIG. 2, the first subcarrier region is not-hatched and the second subcarrier region is hatched. In the full subcarrier band, the intervals belonging to the first subcarrier region and the intervals belonging to the second subcarrier region are alternately allocated. That is, the 16 intervals corresponding to the full subcarrier band are paired into 8 groups. Among the 8 groups, a set of odd groups may be defined as the first subcarrier region and a set of even groups may be defined as the second subcarrier region.

With the use of the full subcarrier band divided as described above, the downlink resources are allocated to the individual service zones illustrated in FIG. 1. That is, among the service zones illustrated in FIG. 1, the first service zone is allocated downlink resources from the subcarriers existing in the first subcarrier region in the full subcarrier band. Among the service zones shown in FIG. 1, the second service zone is allocated downlink resources from the subcarriers existing in the second subcarrier region in the full subcarrier band. Therefore, the first service zone can use only ½ of the resources allocable in the OFDM/OFDMA system, and the second service zone can use only the remaining ½ resources.

The present invention enables a detailed scheme for allocating downlink resources in subcarrier regions being mapped to the individual service zones to follow a common scheme for allocating downlink resources in the existing OFDM/OFDMA system. That is, in a particular subsector, a frequency allocation pattern is defined for each individual subchannel, and subcarriers selected from a corresponding subcarrier region are allocated as resources for the corresponding subchannel according to the defined frequency allocation pattern. The frequency allocation pattern can be defined in the same way for the subsectors belonging to the same service zone. That is, the frequency allocation pattern for each individual subchannel is defined in the same way for all subsectors belonging to the first service zone, and the frequency allocation pattern for each individual subchannel is defined in the same way for all subsectors belonging to the second service zone.

In addition, the frequency allocation pattern for each individual subchannel can be defined in either the same way or different ways for all subsectors belonging to the first and second service zones. Preferably, however, the frequency allocation pattern for each individual subchannel is defined in different ways for each subsector because it is effective to define different frequency allocation patterns in order to apply the load balancing scheme for individual subsectors.

FIGS. 3A through 3D are diagrams illustrating exemplary methods for dividing subcarrier regions to allocate downlink resources according to an embodiment of the present invention. It can be noted from FIGS. 3A through 3D that an embodiment of the present invention divides the full subcarrier region into two subcarrier regions having the same bandwidth.

Figure 3A:
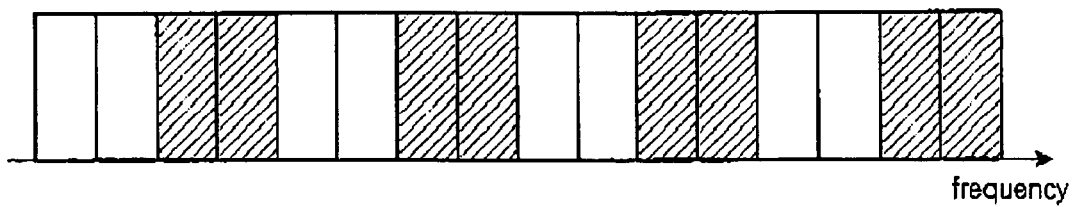
FIGS. 3A through 3D are diagrams illustrating exemplary methods for dividing subcarrier regions to allocate downlink resources according to an embodiment of the present invention.

In FIG. 3A, the full subcarrier region is divided into a plurality of intervals, and the intervals are designated as a first subcarrier region and a second subcarrier region in units of two intervals, by way of example.

Figure 3B:
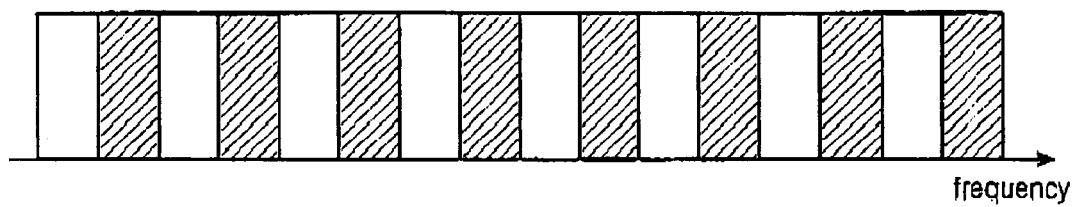

In FIG. 3B, the full subcarrier region is divided into a plurality of intervals, and the intervals are designated as the first subcarrier region and the second subcarrier region in units of one interval, by way of example.

Figure 3C:
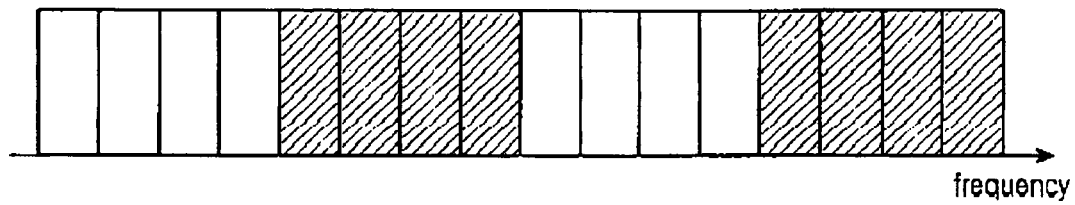

In FIG. 3C, the full subcarrier region is divided into a plurality of intervals, and the intervals are designated as the first subcarrier region and the second subcarrier region in units of four intervals, by way of example.

Figure 3D:
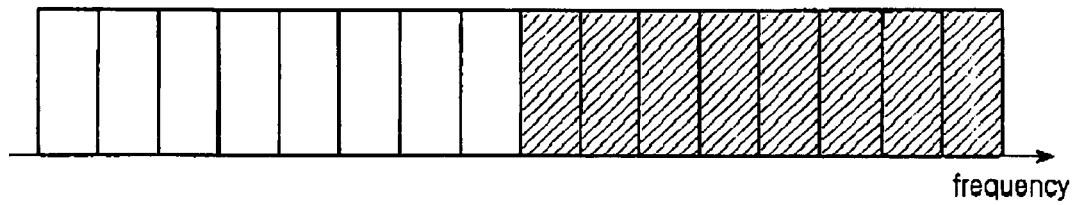

In FIG. 3D, the full subcarrier region is divided into a plurality of intervals, and the intervals are designated as the first subcarrier region and the second subcarrier region in units of half intervals, by way of example.

Although not illustrated in FIGS. 3A through 3D, it would be obvious to those skilled in the art that various modifications can be made by changing the number of intervals included in the full subcarrier region and the arrangement of the intervals.

A-2. Exemplary Implementation of Transmission Apparatus

With reference to the accompanying drawing, a detailed description will now be made of an operation of a transmission apparatus for allocating downlink resources using the foregoing downlink resource allocation scheme and transmitting data with the allocated downlink resources.

Figure 4:
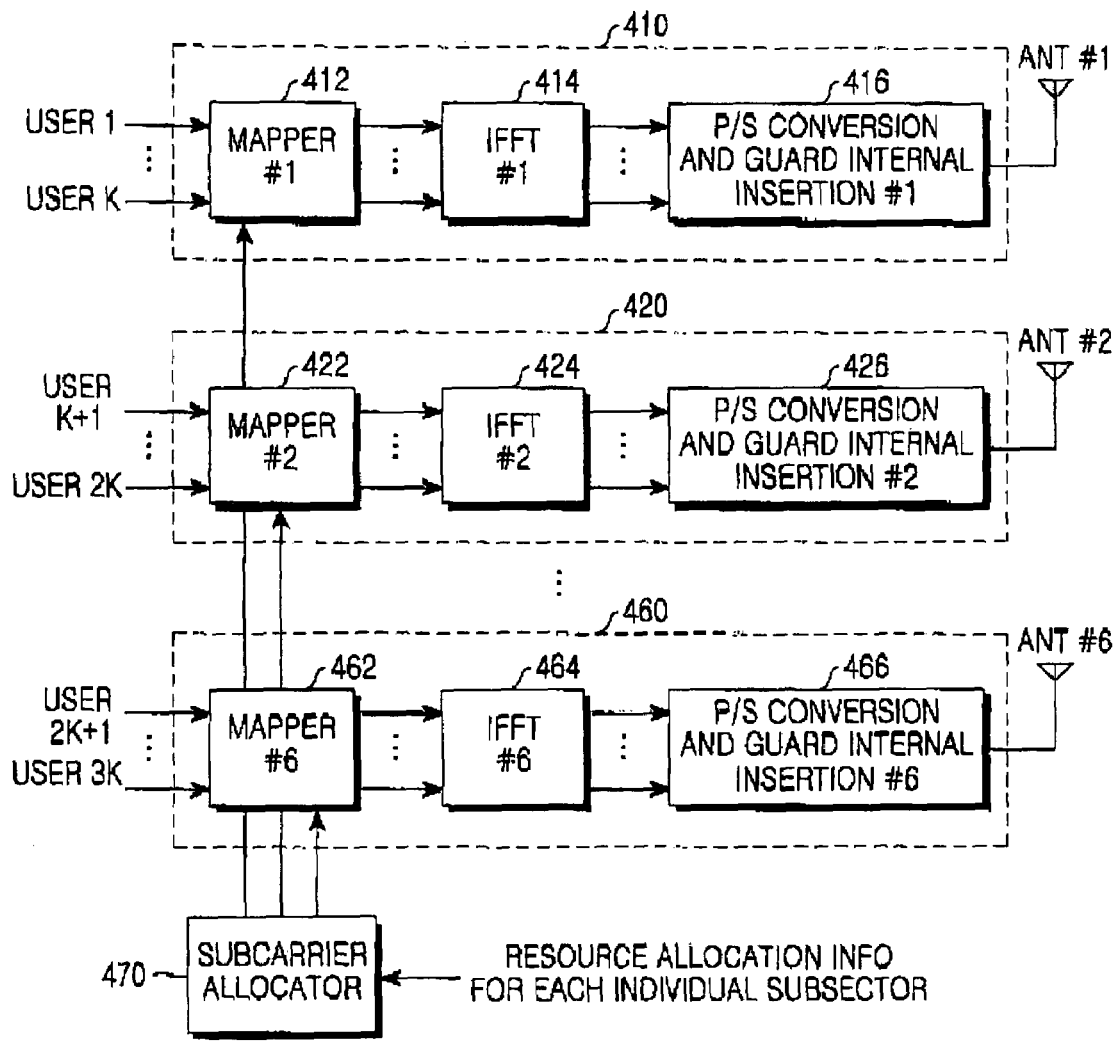
FIG. 4 is a block diagram illustrating a transmission apparatus included in one cell according to an embodiment of the present invention.

FIG. 4 is a block diagram illustrating a transmission apparatus included in one cell according to an embodiment of the present invention. As described above, it is assumed in FIG. 4 that one cell is comprised of six subsectors. That is, the individual subsectors have their own unique transmission antennas.

As illustrated in FIG. 4, the transmission apparatus for a base station includes six transmitters 410 through 460 for transmitting user data for the individual subsectors, and a subcarrier allocator 470. The transmitters 410 through 460 include mappers 412, 422, and 462, IFFT blocks 414, 424, and 464, and parallel-to-serial (P/S) conversion and guard interval insertion blocks 416, 426, and 466, respectively.

Referring to FIG. 4, user data separated for the individual subsectors is provided to their associated transmitters 410 through 460. It is noted that while FIG. 4 proposes a structure in which K users are transmitted by each of the transmitters 410 through 460, the number of users allocated to each individual transmitter is subject to change according to resource reallocation that will be described later.

User data for user #1 through user #K is input to the first mapper 412, user data for user #K+1 through user #2K is input to the second mapper 422, and user data for user #2K+1 through user #3K is input to the third mapper 462. The individual mappers 412, 422, and 462 map the user data provided for the individual users to the downlink subcarriers allocated for the individual users. That is, the mappers 412, 422, and 462 map the user data to input points of the IFFT blocks 414, 424, and 464 by the subcarriers allocated for the individual users. The subcarrier allocation for the mappers 412, 422, and 462 is achieved by the subcarrier allocator 470.

The subcarrier allocator 470 allocates downlink subcarriers for the individual subsectors constituting one cell. For example, the subcarrier allocator 470 divides the full subcarrier band used in the OFDM/OFDMA system into a first subcarrier region and a second subcarrier region having the same bandwidth. The exemplary methods for dividing the full subcarrier band into the first subcarrier region and the second subcarrier region are illustrated in FIGS. 2, and 3A through 3D. In FIGS. 2, and 3A through 3D, the first subcarrier region is not hatched, and the second subcarrier region is hatched.

Among the mappers 412, 422, and 462, mappers included in the odd transmitters are allocated subcarriers from the second subcarrier region, and mappers included in the even transmitters are allocated subcarriers from the first subcarrier region. The subcarrier allocation is achieved according to a predetermined subcarrier allocation pattern. The same subcarrier allocation pattern can be used for the mappers included in the odd transmitters, and the same subcarrier allocation pattern can be used even for the mappers included in the even transmitters.

In the above example, the odd transmitters cover odd subsectors among the subsectors included in one cell, and the even transmitters cover even subsectors among the subsectors included in one cell. In FIG. 1, the odd subsectors are hatched, and the even subsectors are not hatched.

The subcarrier allocator 470 is provided with resource allocation information for the individual subsectors from the outside. The subcarrier allocator 470 measures a load at each subsector according to the resource allocation information, and then performs resource reallocation for balancing the loads of the subsectors. The resource reallocation can be achieved by changing the subcarrier allocation pattern for the subsectors or adjusting a beamwidth of the antennas covering the subsectors. That is, for the subsector being greater in load than other subsectors, the subcarrier allocator 470 may reduce the load by additionally allocating subcarriers or narrowing the beamwidth formed by the antenna.

In the former case where the subcarrier allocator 470 additionally allocates subcarriers for the subsector having the greater load, the subcarrier allocator 470 withdraws the subcarriers allocated for subsectors neighboring the corresponding subsector, thereby maintaining the allocated subcarrier resources as a whole. However, in the latter case where the subcarrier allocator 470 narrows the beamwidth for the subsector having the greater load, the subcarrier allocator widens a beamwidth of the subsectors neighboring the corresponding subsector. A detailed scheme for reallocating resources in this manner will be described later.

The user data mapped to the individual subcarriers by the mappers 412, 422, and 462 is provided to the IFFT blocks 414, 424, and 464 associated with the mappers 412, 422, and 462. The IFFT blocks 414, 424, and 464 perform IFFT modulation on the individual user data, and output time-domain user signals to the P/S conversion and guard interval insertion blocks 416, 426, and 466.

The P/S conversion and guard interval insertion blocks 416, 426, and 466 convert parallel user signals into serial user signals, and insert guard intervals (or cyclic prefixes) in the serial user signals. The guard interval-inserted user signals are transmitted through transmission antennas Ant#1, Ant#2, . . . , Ant#6 associated with the P/S conversion and guard interval insertion blocks 416, 426, and 466.

A-3. Exemplary Implementation of Reception Apparatus

Figure 5:
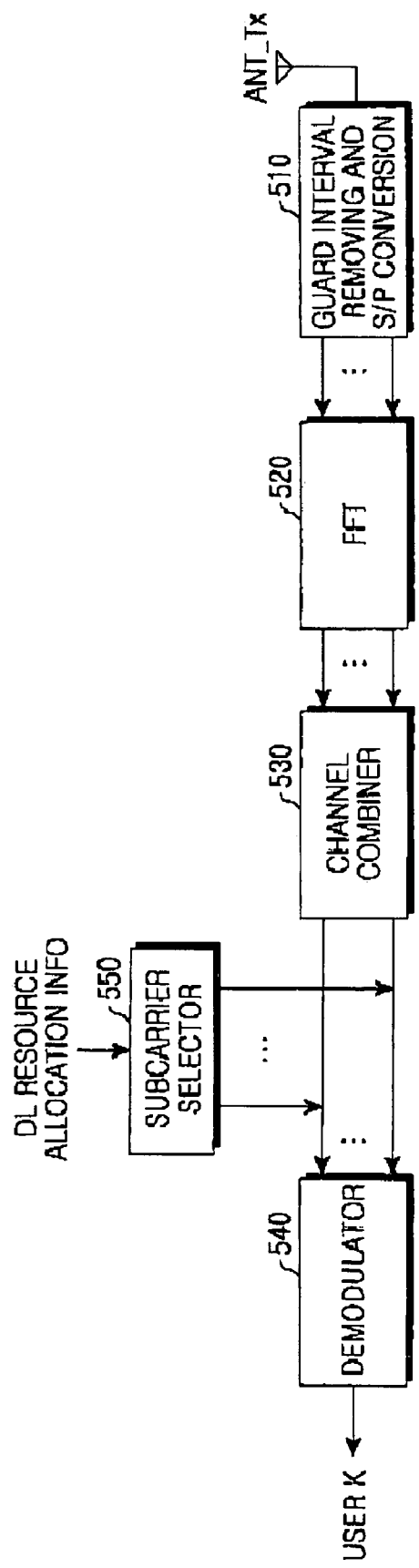
FIG. 5 is a block diagram illustrating a reception apparatus for receiving user data transmitted through the allocated downlink resources according to an embodiment of the present invention.

FIG. 5 is a block diagram illustrating a reception apparatus for receiving user data transmitted through the allocated downlink resources according to an embodiment of the present invention. As illustrated in FIG. 5, the reception apparatus for a mobile terminal includes a guard interval removing and serial-to-parallel (S/P) conversion block 510, an FFT block 520, a channel combiner 530, a subcarrier selector 550, and a demodulator 540.

Referring to FIG. 5, user data transmitted through a downlink is received via a reception antenna ANT_Tx. The user data received via the reception antenna is provided to the guard interval removing and S/P conversion block 510. The guard interval removing and S/P conversion block 510 removes the guard interval inserted in the user data and converts the guard interval-removed user data into parallel user data.

The guard interval-removed parallel user data is provided to the FFT block 520. The FFT block 520 performs FFT transform on the individual user data and outputs frequency-domain signals. The user data transformed into the frequency-domain signals are provided to the channel combiner 530. The channel combiner 530 combines the user data for individual channels. The subcarrier selector 550 receives downlink resource allocation information from a base station, and selects subcarriers allocated thereto according to the downlink resource allocation information. The subcarriers selected by the subcarrier selector 550 and the channel-combined user data are provided to the demodulator 540. The demodulator 540 demodulates the user data using the selected subcarriers.

B. Exemplary Implementation for Uplink

In the following description, a sectorization scheme for an uplink and an uplink resource allocation scheme according thereto will be described in detail. In addition, the uplink resource allocation scheme proposed in the present invention and an operation of a transmission apparatus for transmitting data using the allocated uplink resources will be described in detail.

B-1. Sectorization and Resource Allocation Scheme for Uplink

Figure 6:
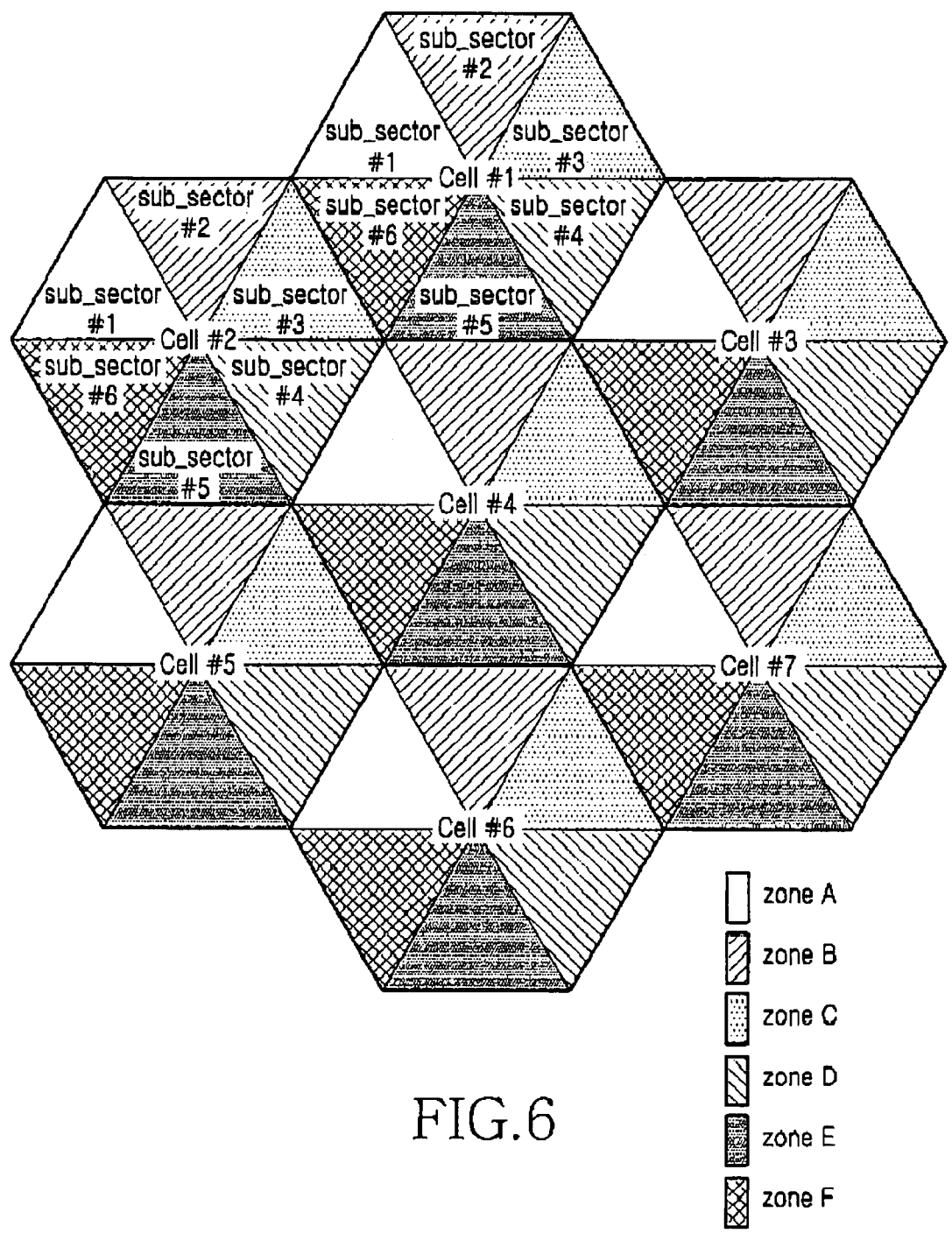
FIG. 6 is a diagram illustrating an exemplary cell structure proposed in the present invention for uplink resource allocation and an exemplary method for allocating uplink resources for the cell structure according to an embodiment of the present invention.

The present invention divides sectors constituting one cell into a plurality of subsectors in order to allocate uplink resources. In the following detailed description of a preferred embodiment, the present invention will divide one cell into a total of six subsectors by dividing each individual sector into two subsectors, as is illustrated in FIG. 6. However, as indicated above, it should be noted that the present invention is not limited to the cell structure comprised of six subsectors. That is, the present invention can be applied in the same way to every cell structure in which one cell is comprised of a predetermined number of subsectors, the number being greater than six and a multiple of 2.

More specifically, the present invention proposes two exemplary embodiments of an uplink resource allocation scheme. A first uplink resource allocation scheme additionally divides subcarrier regions divided for downlink resource allocation to allocate uplink resources. A second uplink resource allocation scheme allocates uplink resources using the intact subcarrier regions divided for downlink resource allocation.

FIG. 6 is a diagram illustrating an exemplary cell structure proposed in the present invention for uplink resource allocation and an exemplary method for allocating uplink resources for the cell structure according to an embodiment of the present invention. It is assumed in FIG. 6 that cells have an ideal type and the number of the cells is limited to seven.

As illustrated in FIG. 6, each cell is comprised of six subsectors, and the individual subsectors are distinguished by different marks. This indicates that the individual subsectors are allocated different uplink resources. That is, the six subsectors correspond to six service zones denoted by 'zone A' through 'zone F'. The six service zones can be divided into a first service zone indicating a set of non-hatched service zones zone A, zone C, and zone E, and a second service zone indicating a set of hatched service zones zone B, zone D, and zone F. As a result, orthogonal uplink resources are allocated to neighboring subsectors in the same cell. Herein, the term "orthogonal" indicates that there is no interference between the uplink resources.

In addition, interference between the neighboring cells should also be taken into account in the process of allocating the uplink resources. Preferably, in FIG. 6, subsectors in different cells, to which the same subcarriers are allocated as uplink resources, should be spaced apart as far as possible in order to minimize interference between the neighboring cells. For example, subcarriers allocated to a subsector #6 of a cell #1 can be reused in a subsector #6 in a cell #2, which is spaced apart farthest from the subsector #6 of the cell #1. That is, the same subcarriers are reused as uplink resources for the subsectors having the same index in the respective cells. Therefore, it can be considered that the subsectors having the same index in the different cells belong to the same service zone.

A detailed description will now be made of exemplary methods for allocating uplink resources for the cell structure illustrated in FIG. 6. As stated above, the present invention will present two exemplary embodiments for uplink resource allocation.

a) First Embodiment for Uplink Resource Allocation

The first embodiment divides the full subcarrier band into a first subcarrier region and a second subcarrier region having the same size. The first embodiment divides the first subcarrier region into subintervals associated with the subsectors in the first service zone in the same cell, and allocates subcarriers selected in the divided subintervals as uplink resources for the subsectors in the first service zone. Similarly, the first embodiment divides the second subcarrier region into subintervals associated with the subsectors in the second service zone in the same cell, and allocates subcarriers selected in the divided subintervals as uplink resources for the subsectors in the second service zone.

Figure 7:
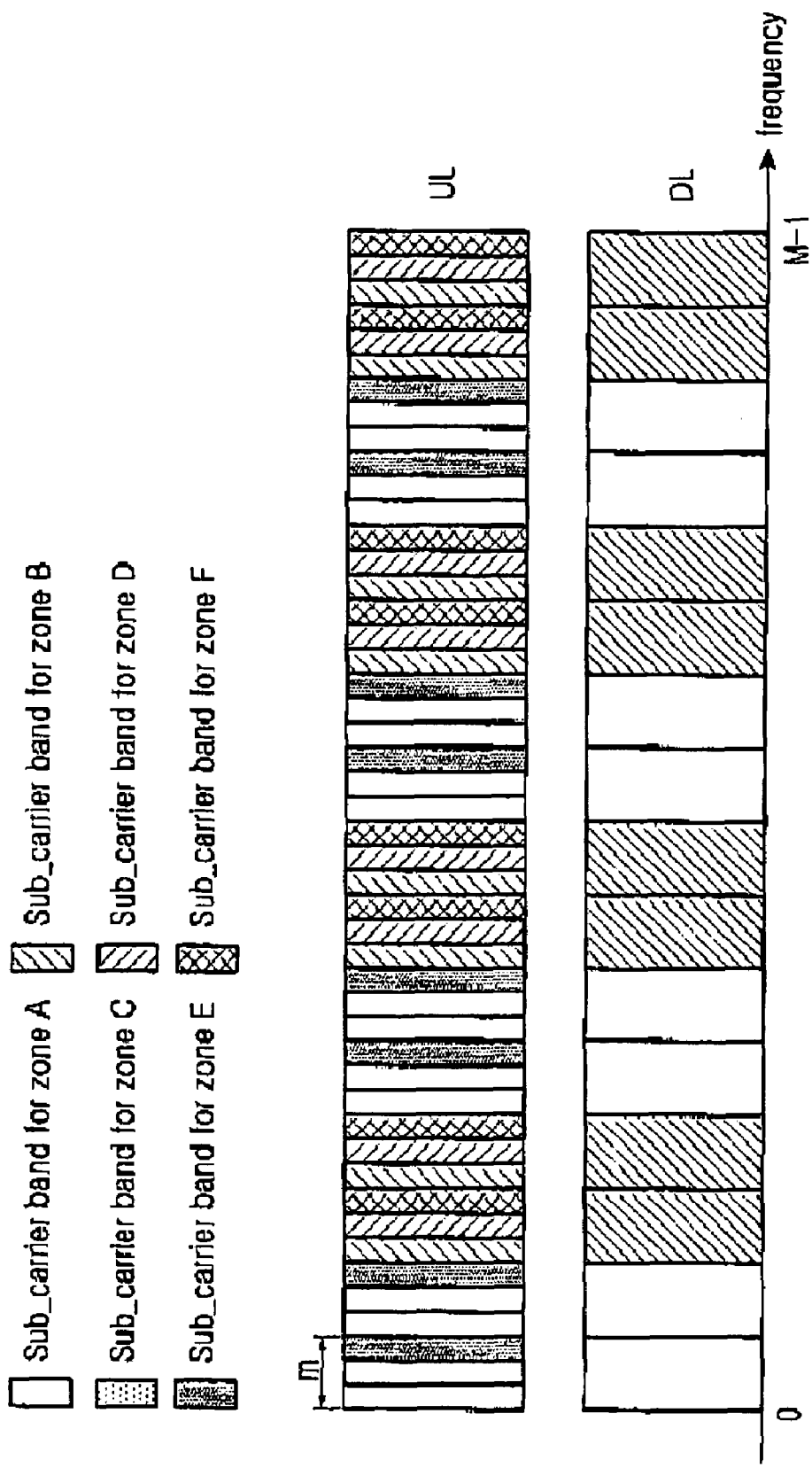
FIG. 7 is a diagram illustrating an exemplary method for distributing uplink resources according to an embodiment for uplink resource allocation.

FIG. 7 is a diagram illustrating an exemplary method for distributing uplink resources according to the first embodiment for uplink resource allocation. Referring to FIG. 7, the full subcarrier bandwidth (including M subcarriers) used in the OFDM/OFDMA system is divided into two subcarrier regions, i.e., a "first subcarrier region" and a "second subcarrier region."

In FIG. 7, the first subcarrier region is not hatched and the second subcarrier region is hatched. The first subcarrier region and the second subcarrier region are each divided into a plurality of intervals having a predetermined bandwidth m. The first subcarrier region and the second subcarrier region are each divided into eight intervals, by way of example. The exemplary uplink resource allocation is equal to the downlink resource allocation in terms of the method for dividing the full subcarrier band.

However, in order to allocate uplink resources, the individual intervals are additionally divided. Herein, the additionally divided intervals will be referred to as "subintervals"). The number of the subintervals can be defined as a quotient obtained by dividing, by two, a positive multiple of the number of subsectors constituting one cell.

In FIG. 7, one interval is divided into three subintervals, by way of example. As a result, the full subcarrier band allocated as uplink resources is comprised of six different types of subintervals. Among the six different types of subintervals, three subintervals are divided from the first subcarrier region, and the remaining three subintervals are divided from the second subcarrier region. The divided subintervals become subcarrier bands for the zone A through the zone F defined in FIG. 6. Therefore, in FIG. 7, six different types of subintervals are illustrated.

As descried above, the marks for distinguishing the subintervals are mapped to the marks for distinguishing the subsectors in one cell on a one-to-one basis. That is, the individual subsectors in FIG. 6 are allocated subcarriers from the subintervals having their own unique mark among the marks illustrated in FIG. 7. By distinguishing the subcarrier regions (subintervals) that can be allocated as uplink resources for the individual subsectors in this manner, it is possible to prevent the interference between neighboring subsectors and also the interference from downlink resources used the neighboring cells.

The foregoing exemplary uplink resource allocation has been restrictively described with reference to where the downlink resources are allocated in the subcarrier allocation method illustrated in FIG. 2. However, the present invention can be applied in the same way even to the case where the downlink resources are allocated in any one of the subcarrier allocation methods illustrated in FIGS. 3A through 3D.

In addition, in the foregoing embodiment, the full subcarrier band is divided into six different types of subintervals, by way of example. However, when the full subcarrier band is divided into six types of subintervals, a particular user may use only one particular frequency band, making it difficult to obtain frequency diversity gain. Therefore, it is preferable to divide the full subcarrier band into 12 types of subintervals.

b) Second Embodiment for Uplink Resource Allocation

The second embodiment for uplink resource allocation, like the first embodiment, divides the full subcarrier band into a first subcarrier region and a second subcarrier region. Further, the second embodiment divides the total subchannels allocable in the first subcarrier region into as many subchannel groups as the number of subsectors belonging to the first service zone in one cell. This is applied in the same way even for the second subcarrier region. Therefore, it is preferable to determine the total number of channels as an integer that can be divided by the number of the subsectors.

For convenience, it will be assumed herein that the total number of subchannels allocable in each of the first subcarrier region and the second subcarrier region is 60. Therefore, assuming that the total number of subchannels is 120 in this way, if the first and second service zones are each comprised of three subsectors, 20 subchannels (or a subchannel group) are allocated as uplink resources for each individual subsector.

For example, 60 subchannels allocated from the first subcarrier region are divided into three subchannel groups. That is, $1^{st}$ through $20^{th}$ subchannels are divided into a first subchannel group, $21^{st}$ through $40^{th}$ subchannels are divided into a second subchannel group, and $41^{st}$ through $60^{th}$ subchannels are divided into a third subchannel group. The $1^{st}$ through $20^{th}$ subchannels belonging to the first subchannel group are allocated as uplink resources for a subsector #1, the $21^{st}$ through $40^{th}$ subchannels belonging to the second subchannel group are allocated as uplink resources for a subsector #3, and the $41^{st}$ through $60^{th}$ subchannels belonging to the third subchannel group are allocated as uplink resources for a subsector #5.

Similarly, 60 subchannels allocated from the second subcarrier region are divided into three subchannel groups. That is, $1^{st}$ through $20^{th}$ subchannels are divided into a first subchannel group, $21^{st}$ through $40^{th}$ subchannels are divided into a second subchannel group, and $41^{st}$ through $60^{th}$ subchannels are divided into a third subchannel group. The $1^{st}$ through $20^{th}$ subchannels belonging to the first subchannel group are allocated as uplink resources for a subsector #2, the $21^{st}$ through $40^{th}$ subchannels belonging to the second subchannel group are allocated as uplink resources for a subsector #4, and the $41^{st}$ through $60^{th}$ subchannels belonging to the third subchannel group are allocated as uplink resources for a subsector #6.

In the description above, the uplink resource allocation scheme divides subchannels. Alternatively, the uplink resource allocation scheme can divide subcarrier allocation patterns used for configuring subchannels, and allocate the divided subcarrier allocation patterns for the individual subsectors. In this case, the subcarrier allocation patterns in the first subcarrier region and the subcarrier allocation patterns in the second subcarrier region can be determined as the same subcarrier allocation patterns.

Alternatively, the subcarrier allocation patterns in the first subcarrier region and the subcarrier allocation patterns in the second subcarrier region can be determined as different subcarrier allocation patterns.

By allocating uplink resources in this manner, it is possible to prevent interference between neighboring subsectors in neighboring cells. In this case, if independent subcarrier allocation patterns are used in units of cells, interference between neighboring subsectors in neighboring cells may occur. Therefore, the same subcarrier allocation pattern and the same division rule are applied for every cell. That is, the subcarrier allocation patterns applied to all cells are equal to each other. In this rule, mobile terminals using the subchannels configured with the same subcarriers as uplink resources are located in subsectors having the same index in each cell. In this case, the frequency reuse efficiency can be high because a frequency reuse distance is maximized at a frequency reuse factor of 1. That is, the frequency reuse is possible in a low-interference condition.

C. Load Balancing Scheme

A detailed description will now be made of a load balancing scheme for balancing loads of the sectors to solve a problem that loads are concentrated on a particular subsector.

The present invention proposes two exemplary embodiments of the load balancing scheme. A first load balancing scheme is a fixed beam scheme for redistributing downlink and uplink resources allocated for each individual subsector for load balancing. That is, the fixed beam scheme borrows resources from a neighboring beam if traffic is concentrated on a particular beam. A second load balancing scheme is an adjustable-beamwidth scheme for adjusting a service zone of each subsector. That is, the adjustable-beamwidth scheme induces softer handoff to a neighboring beam by reducing a width of a particular beam on which traffic is concentrated.

C-1. First Embodiment for Load Balancing

Figure 8:
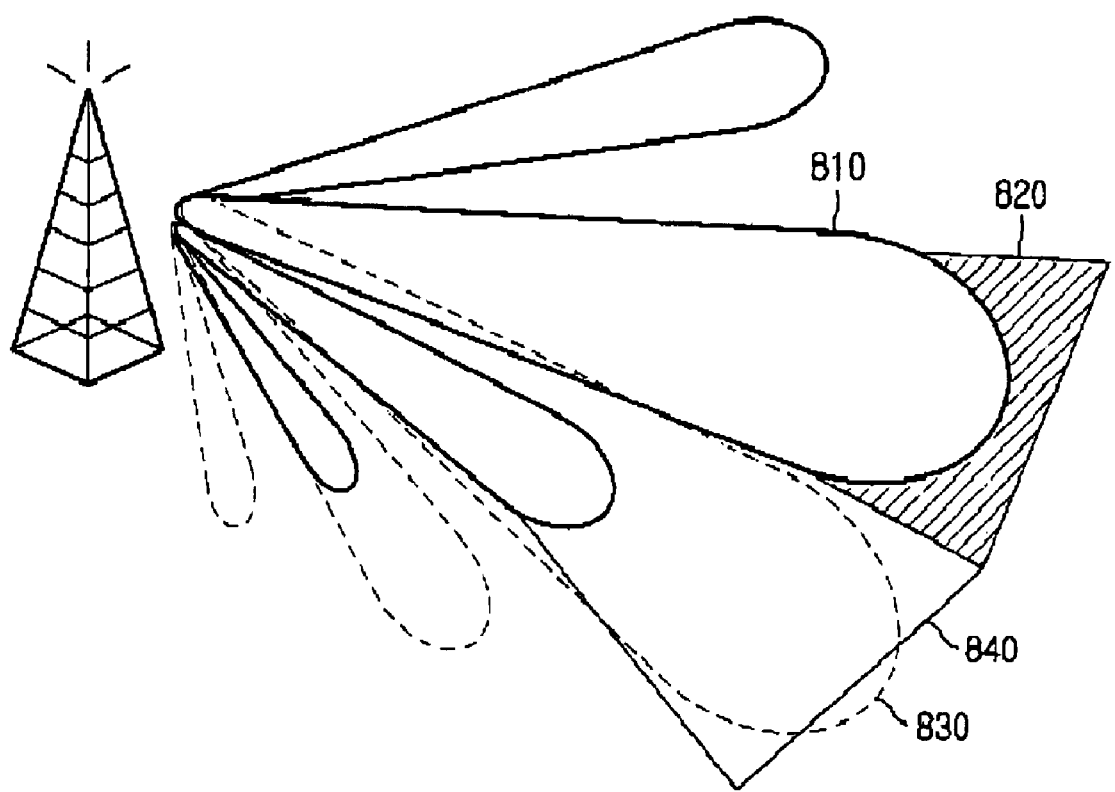
FIG. 8 is a diagram illustrating an exemplary method for balancing loads by redistributing uplink and downlink resources using a fixed beam scheme.

FIG. 8 is a diagram illustrating an exemplary method for balancing loads by redistributing uplink and downlink resources using the fixed beam scheme. FIG. 8 illustrates an exemplary method for redistributing resources in one sector divided into two subsectors 820 and 840. Herein, antenna beams 810 and 830 are provided to the subsectors 820 and 840, respectively, and the antenna beams 810 and 830 are fixed to the same beamwidth. In the following description, it will be assumed that a load at the first subsector 820 is greater than a load at the second subsector 840.

Referring to FIG. 8, uplink and downlink resource allocation at the first subsector 820 and the second subsector 840 is performed by the resource allocation schemes proposed above. For initial resource allocation, it is assumed that a load in the first subsector 820 is equal to a load in the second subsector 840, so the same sized resources would be allocated for each of them. Users in the first subsector 820 and the second subsector 840 transmit/receive user data using the allocated uplink and downlink resources.

In this state, an increase in load in the first subsector 820 causes a lack of resources allocated to the first subsector 820. There are various causes of the increase in the load. Typically, the causes may include an increase in the number of users in the first subsector 820 and a user's demand for an improved quality-of-service (QoS). In this situation, there is, of course, a need for allocating additional resources. This embodiment borrows resources allocated to the second subsector 840, i.e., a neighboring subsector, and additionally allocates the borrowed resources to the first subsector 820. Such an operation is called "resource reallocation." Accordingly, the embodiment should take into account a load, i.e., the presence/absence of surplus resources, in the second subsector 840, instead of taking into account only the increase in load in the first subsector 820.

More specifically, a first transmission apparatus (not shown) for generating a first antenna beam 810 covering the first subsector 820 performs an operation of periodically monitoring a load in the first subsector 820. The transmission apparatus can monitor the load depending on a use factor of resources allocated thereto. For example, the first transmission apparatus detects a lack of resources, if the used amount of resources allocated thereto is greater than a predetermined threshold.

The first transmission apparatus sends a request for required resources to a second transmission apparatus (not shown), i.e., a neighboring transmission apparatus, upon detecting a lack of uplink or downlink resources due to an increase in its load. The second transmission apparatus generates a second antenna beam 830 covering the second subsector 840.

Upon receiving a resource reallocation request from the first transmission apparatus, the second transmission apparatus sends an approval for the use of surplus resources among the resources allocated thereto to the first transmission apparatus. That is, the second transmission apparatus provides the first transmission apparatus with information indicating subcarriers corresponding to the surplus resources. The first transmission apparatus transmits/receives user data using the resources, or subcarriers, reallocated from the second transmission apparatus.

Although the foregoing embodiment takes resource redistribution between subsectors into account, the resource redistribution may be performed by an upper layer, e.g., a base station controller (BSC), that controls resource management of the subsectors. In this case, a subsector that requires additional resource allocation sends a resource allocation request to the upper layer. Then the upper layer withdraws resources of any subsector having surplus resources among the subsectors managed by itself, and reallocates the withdrawn resources to the subsector from which an additional resource allocation request was received.

The foregoing resource redistribution reduces interference between beams in the same sector, but cannot prevent interference from neighboring beams of neighboring sectors or neighboring cells. However, the interference is insignificant compared with that occurring in the conventional scheme.

C-2. Second Embodiment for Load Balancing

Figure 9:
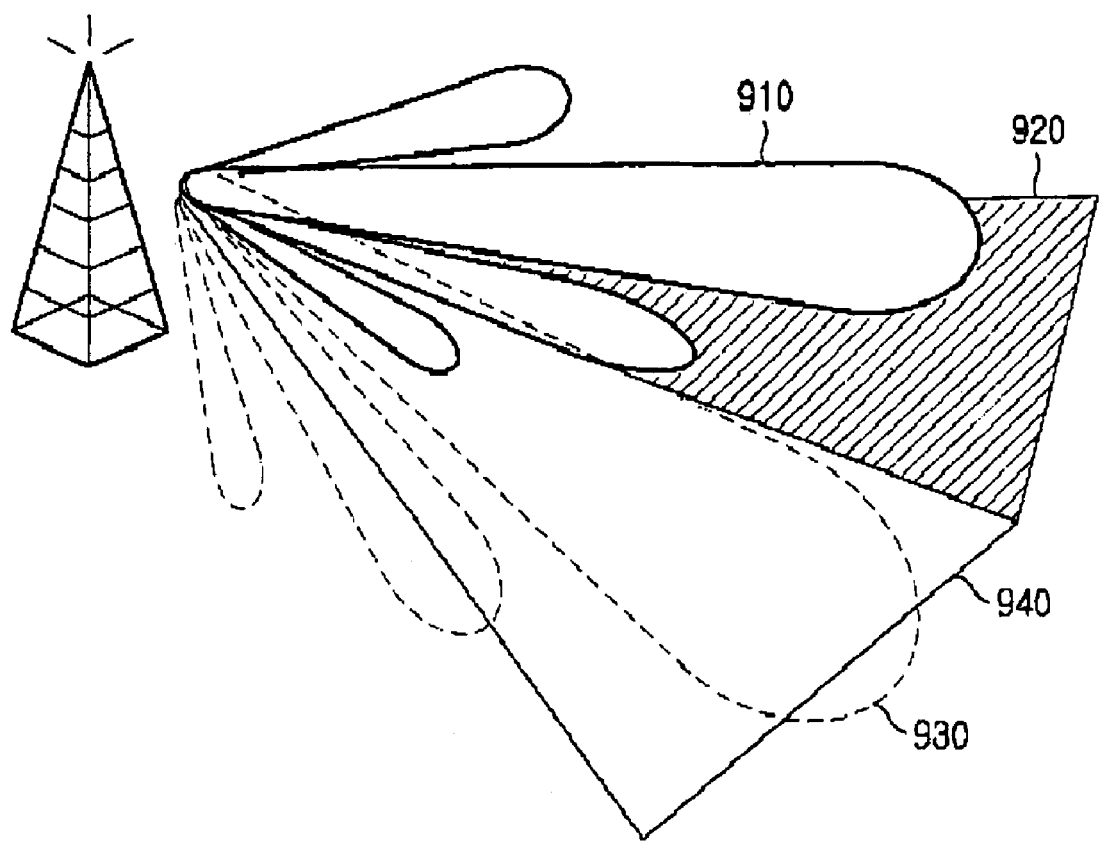
FIG. 9 is a diagram illustrating an exemplary method for balancing loads by redistributing uplink and downlink resources using an adjustable-beamwidth scheme.

FIG. 9 is a diagram illustrating an exemplary method for balancing loads by redistributing uplink and downlink resources using the adjustable-beamwidth scheme. More specifically, FIG. 9 illustrates an exemplary method for redistributing resources in one sector divided into two subsectors 920 and 940. Herein, antenna beams 910 and 930 are provided to the subsectors 920 and 940, respectively, and the antenna beams 910 and 930 are fixed to the same beamwidth. In the following description, it will be assumed that a load at the first subsector 920 is greater than a load at the second subsector 940.

Referring to FIG. 9, uplink and downlink resource allocation at the first subsector 920 and the second subsector 940 is performed by the resource allocation schemes proposed above. For initial resource allocation, it is assumed that a load in the first subsector 920 is equal to a load in the second subsector 940, so the same sized resources would be allocated for each of them. Users in the first subsector 920 and the second subsector 940 transmit/receive user data using the allocated uplink and downlink resources.

In this state, an increase in load in the first subsector 920 causes a lack of resources allocated to the first subsector 920. There are various causes of the increase in the load. Typically, the causes may include an increase in the number of users in the first subsector 920 and a user's demand for an improved QoS. In this situation, a load reduction process will be processed. In order to reduce the load, this embodiment decreases a width of the first antenna beam 910. The decrease in the width of the first antenna beam 910 narrows a corresponding service zone, thereby reducing the load.

If the width of the first antenna beam 910 is narrowed, some users may fail to transmit and receive user data with the first antenna beam 910. In this case, it is necessary to allow such users to be able to continuously transmit/receive user data with the second antenna beam 930, i.e., a neighboring antenna beam. In order to apply the foregoing method, it is necessary to take into account the increase in the load of the first subsector 920 and also the load of the second subsector 940.

More specifically, a first transmission apparatus (not shown) for generating the first antenna beam 910 covering the first subsector 920 performs an operation of periodically monitoring a load in the first subsector 920. The transmission apparatus can monitor the load depending on a use factor of resources allocated thereto. For example, the first transmission apparatus detects a lack of resources, if the used amount of resources allocated thereto is greater than a predetermined threshold.

The first transmission apparatus sends a request for widening the current antenna beamwidth to a second transmission apparatus (not shown), i.e., a neighboring transmission apparatus, upon detecting a lack of uplink or downlink resources due to an increase in its load. The second transmission apparatus generates a second antenna beam 930 covering the second subsector 940.

Upon receiving the request from the first transmission apparatus, the second transmission apparatus determines if it can widen the second antenna beam 930 taking its load into account. Widening the antenna beam is equivalent to increasing its load.

The second transmission apparatus sends an approval for narrowing the antenna beamwidth to the first transmission apparatus, if it is determined that it can widen the second antenna beam 930. Thereafter, the second transmission apparatus widens the second antenna beam 930, thereby increasing its own load.

Upon receipt of the approval from the second transmission apparatus, the first transmission apparatus narrows the width of the first antenna beam 910, thereby reducing its own load.

The user terminal that can no longer transmit and receive user data using the first transmission antenna beam 910, will attempt softer handoff to the second subsector 940 to transmit/receive user data using the second antenna beam 930. After the successful softer handoff, the user terminal can continue to transmit and receive user data using the second antenna beam 930.

Although the foregoing embodiment takes resource redistribution between subsectors into account, the resource redistribution may be performed by an upper layer, e.g., a BSC that takes charge of resource management of the subsectors. In this case, a subsector that has a great load, such that resources currently allocated thereto are insufficient, sends a beamwidth adjust request to the upper layer. Then the upper layer sends a request for widening a beamwidth of a subsector having surplus resources among the neighboring subsectors of the subsector from which the beamwidth adjust request was received. Subsequently, the upper layer sends a beamwidth adjust approval to the subsector from which the beamwidth adjust request was received.

D. Cross Time Slot

Commonly, when an uplink transmission ratio is different from a downlink transmission ratio in each cell, a cross time slot (CTS) phenomenon occurs. Application of the present invention can moderate the CTS phenomenon by using subcarriers, which may serve as interference to each other, for the subsectors in neighboring cells, which are spaced apart farthest from each other.

Figure 10:
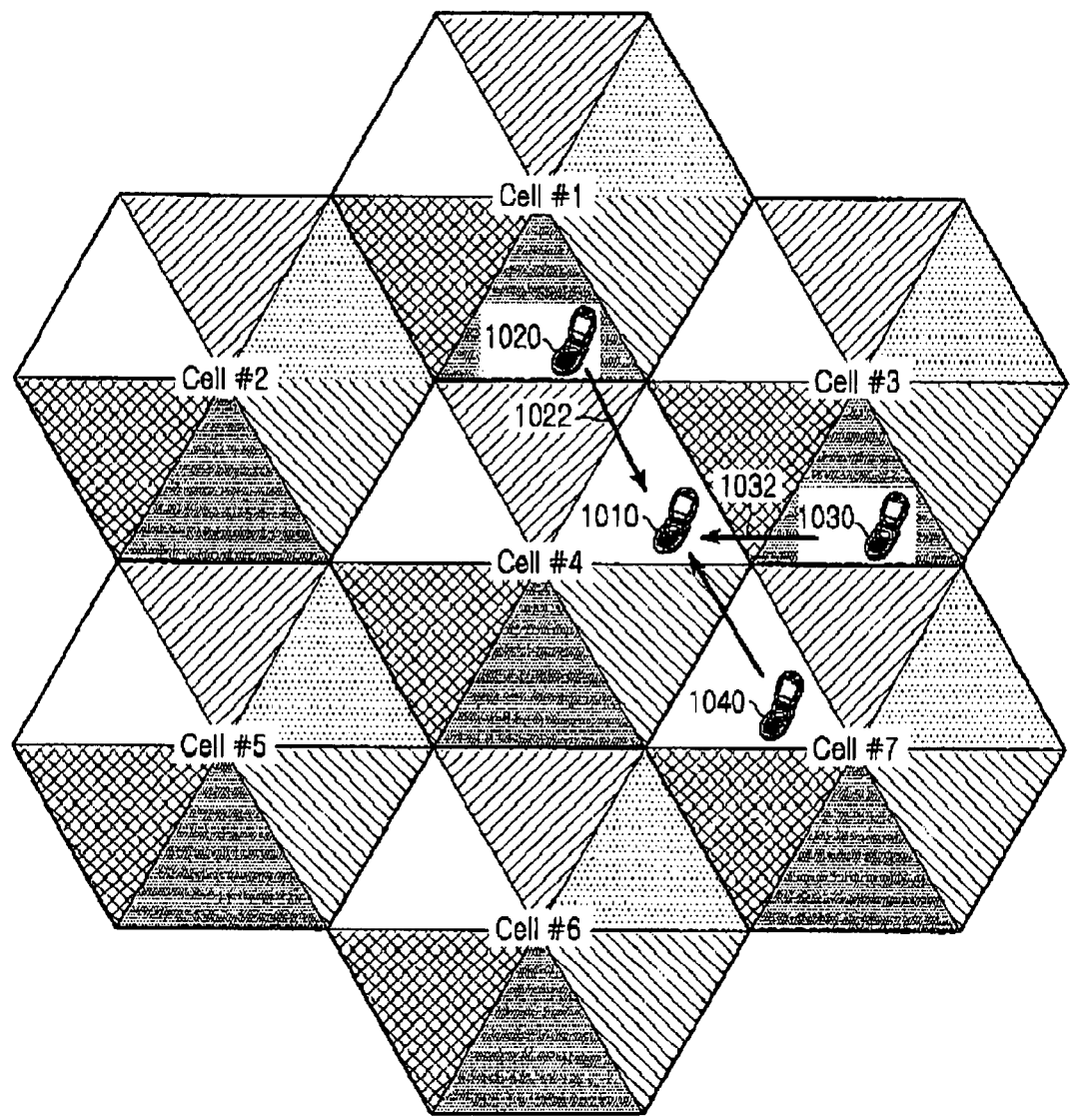
FIG. 10 is a diagram illustrating a CTS phenomenon given for a description of an embodiment of the present invention.

FIG. 10 is a diagram illustrating a CTS phenomenon given for a description of an embodiment of the present invention. It is assumed in FIG. 10 that a cell #4 is transmitting user data through a downlink, and the other cells of cell #1, cell #2, cell #3, cell #5, cell #6, and cell #7 are transmitting user data through an uplink.

Referring to FIG. 10, main interference to a first terminal 1010 that is receiving user data through the downlink from a particular subsector in the cell #4 is caused by a terminal located in a neighboring subsector. The neighboring subsector includes subsectors included in the same cell #4, and subsectors included in neighboring cell #1, cell #3, and cell #7.

The present invention, as described above, allocates subcarriers in different subcarrier regions for the neighboring subsectors. Therefore, the first terminal 1010 can avoid interference caused by a terminal located in a neighboring sector of its subsector.

However, as illustrated in FIG. 10, interferences 1022, 1032, and 1042 occur, which are caused by terminals 1020, 1030, and 1040, located in subsectors allocated subcarriers from the same subcarrier region as the subsector in which the terminal 1010 is located among the subsectors included in the neighboring cell #1, cell #3, and cell #7. However, such interferences do not act as considerable interferences to the first terminal 1010.

E. Exemplary Application to SDMA System

The present invention can be applied to a system using a Space Division Multiple Access (SDMA) scheme (hereinafter referred to as an "SDMA system"). The SDMA system uses a plurality of narrow beams for a base station in order to increase its capacity. When the present invention is applied to the SDMA system, each of 6 subsectors included in one cell can be formed of a predetermined number K of beams.

Figure 11:
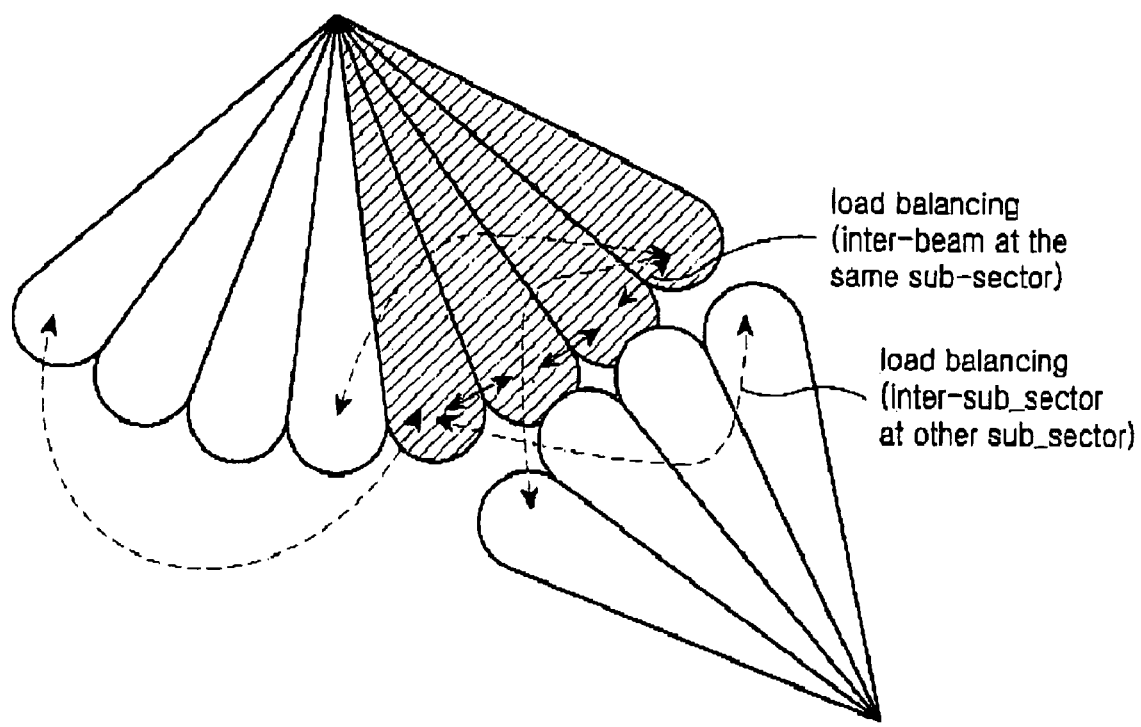
FIG. 11 is a diagram illustrating an exemplary method for applying the present invention to an SDMA system.

FIG. 11 is a diagram illustrating an exemplary method for applying the present invention to an SDMA system. It is assumed in FIG. 11 that each individual subsector is allocated M subcarriers and each subsector is formed of K narrow beams. Therefore, each individual narrow beam is allocated M/K subchannels. The subchannels allocated to each individual narrow beam are orthogonal with each other. The operation of allocating the subchannels to each individual narrow beam is performed using the above intact resource allocation scheme.

Load control between beams formed in the same subsector is performed through variable channel borrowing. The variable channel borrowing can be implemented in the same way as the first embodiment of the load balancing scheme. In this case, there are two possible channel borrowings, i.e., channel borrowing between beams in the same subsector, and channel borrowing with a beam in a neighboring subsector. The neighboring subsector can be either a subsector located in the same cell or a subsector located in a neighboring cell.

Referring to FIG. 11, in the same subsector, load balancing is performed through channel borrowing between neighboring beams as is denoted by a solid line. Such channel borrowing can be achieved because orthogonal subchannels are allocated for the beams in the same subsector.

However, when load balancing is performed through channel borrowing with a neighboring subsector, a channel is borrowed from a beam to which subchannels being orthogonal with its neighboring beams among the beams in the neighboring subsector. The neighboring beams can include the beams existing in the same cell as its own cell and also the beams forming a neighboring cell facing its own cell.

As described above, there are two possible neighboring subsectors, i.e., subsectors included in the same cell as its own cell or subsectors facing its own cell. If a channel is to be borrowed from a subsector included in the same cell, a channel is borrowed from a beam in the same location as its own location in the subsector. Otherwise, if a channel is to be borrowed from a subsector facing its own cell, a channel is borrowed from a beam located in a diagonal direction from its own location in the subsector. The exemplary methods for borrowing channels from the neighboring subsectors are denoted by dotted line in FIG. 11.

Figure 12:
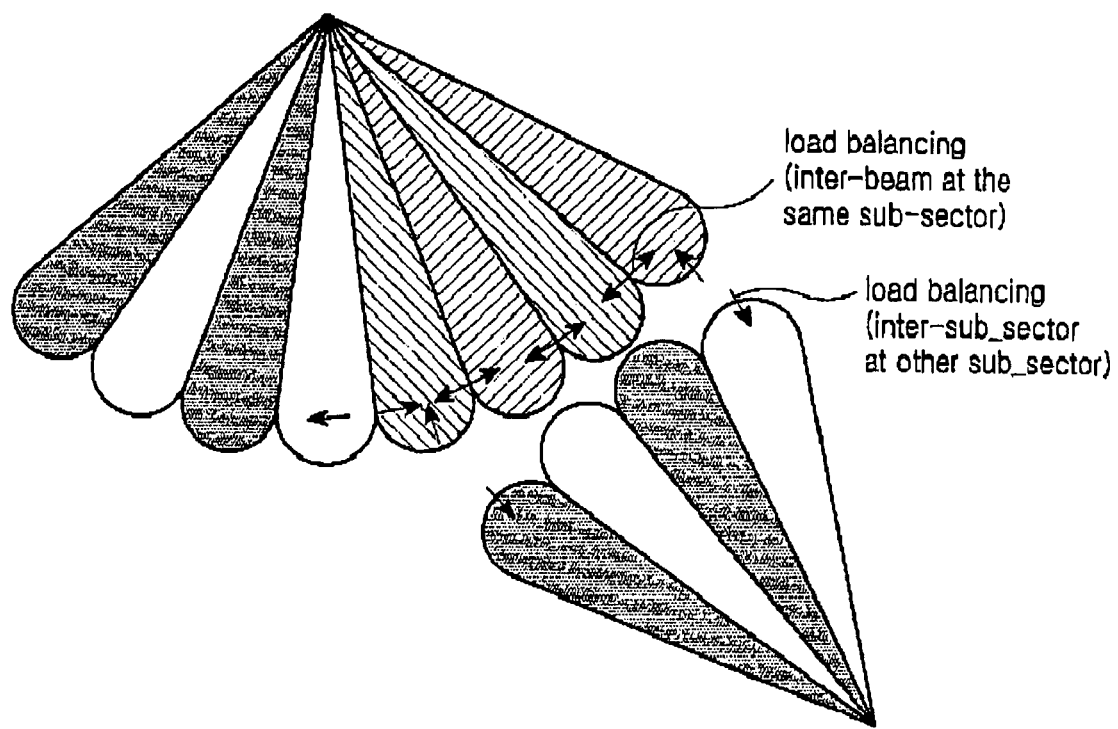
FIG. 12 is a diagram illustrating another exemplary method for applying the present invention to an SDMA system.

FIG. 12 is a diagram illustrating another exemplary method for applying the present invention to an SDMA system. It is assumed in FIG. 12 that each individual subsector is allocated M subcarriers and each subsector is formed of K narrow beams, where K is an even number. In addition, M subchannels are divided into two orthogonal subgroups, and the orthogonal subgroups are sequentially allocated for the individual beams. That is, the subchannels are allocated for the individual beams in units of M/2 subchannels in an orthogonal manner. Allocating the subchannels to each individual narrow beam is performed using the above intact resource allocation scheme.

Referring to FIG. 12, in the same subsector, load balancing is performed through channel borrowing between neighboring beams, as is denoted by a solid line. Such channel borrowing can be achieved because M subchannels are divided into two subgroups and subchannels in different subgroups are allocated for neighboring beams in the same subsector. Therefore, the neighboring beams are orthogonal with each other.

However, when load balancing is performed through channel borrowing with a neighboring subsector, a channel is borrowed from a particular beam in subsectors in the same cell or from a facing beam. The facing beam belongs to a cell neighboring its own cell. Therefore, a beam located in a boundary of a subsector can borrow a channel from both a beam defining a boundary with itself and a beam facing itself. The exemplary methods for borrowing channels from the neighboring subsectors are denoted by dotted line in FIG. 12.

As can be understood from the foregoing two examples, the load control between multiple beams in the same subsector is performed through variable channel borrowing. In addition, the load balancing scheme through channel borrowing between neighboring sectors in the same cell or neighboring cells, borrows subchannels being orthogonal with allocated subchannels for the facing beams in the neighboring cell from the neighboring subsector in the same cell or the facing subsector in the neighboring cell. The resources borrowed from the neighboring beam or neighboring subsector are necessarily allocated to a terminal having a good path gain or channel condition, thereby reducing interference between the borrowed channels.

The foregoing novel sectorization and resource allocation can:

(a) minimize interference between neighboring sectors, which may become a cause of performance degradation in the same cell;

(b) minimize interference between sectors located in different cells or sectors being concatenated with each other, thereby avoiding interference between neighboring cells;

(c) simultaneously utilize resources of two neighboring sectors by enabling the neighboring sectors to use orthogonal adjacent subcarrier bands, thereby supporting soft handoff;

(d) enable load balancing between subsectors, thereby eliminating concentrated loads on a particular subsector; and (e) reduce interference that may occur from simultaneous transmission of an uplink and a downlink.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for allocating resources for individual sectors in an orthogonal frequency division multiplexing (OFDM) mobile communication system, the method comprising the steps of:

dividing a hill subcarrier band into a first subcarrier region and a second subcarrier region having a same size;

allocating subcarriers selected from the first subcarrier region based on a first subcarrier allocation pattern as downlink resources for sectors in a first service zone among a plurality of sectors included in one cell;

allocating subcarriers selected from the second subcarrier region based on a second subcarrier allocation pattern as downlink resources for sectors in a second service zone; and performing one of a first operation and a second operation when a load for a downlink in one of the sectors is greater than a load for a downlink in a neighboring sector, wherein the cell includes a predetermined number of sectors, the predetermined number is a multiple of 2 and is at least equal to 6, and the sectors in the first service zone neighbor the sectors in the second service zone, wherein the first operation comprises releasing downlink resources allocated for the neighboring sector and then reallocating the released downlink resources as downlink resources for the one of the sectors, and the second operation comprises narrowing an antenna beamwidth forming the one of the sectors and widening an antenna beamwidth forming the neighboring sector.

2. The method of claim 1, wherein the first subcarrier region and the second subcarrier region are divided into a plurality of subcarrier bands having a predetermined size.

3. The method of claim 1, wherein the first subcarrier region and the second subcarrier region are uniformly distributed over the flail subcarrier band.

4. The method of claim 1, wherein subcarriers selected from different subcarrier regions are allocated as downlink resources for sectors, which are included in different cells, but neighbor each other.

5. The method of claim 1, wherein the first subcarrier region is divided into subintervals mapped to sectors in the first service zone, and subcarriers selected from the divided subintervals are allocated as uplink resources for the sectors in the first service zone.

6. The method of claim 5, wherein the second subcarrier region is divided into subintervals mapped to sectors in the second service zone, and subcarriers selected from the divided subintervals are allocated as uplink resources for the sectors in the second service zone.

7. The method of claim 6, further comprising the step of:

when a load for an uplink in one of the sectors is greater than a load for an uplink in a neighboring sector, releasing uplink resources allocated for the neighboring sector and then reallocating the released uplink resources as uplink resources for the one of the sectors.

8. The method of claim 6, further comprising the step of:

when a load for an unlink in one of the sectors is greater than a load for an uplink in a neighboring sector, narrowing an antenna beamwidth forming the one of the sectors and widening an antenna beamwidth forming the neighboring sector.

9. A transmission apparatus in an orthogonal frequency division multiplexing (OFDM) mobile communication system for transmitting user data for individual sectors, the apparatus comprising:

a subcarrier allocator for dividing a full subcarrier band into a first subcarrier region and a second subcarrier region having a same size, allocating subcarriers selected from the first subcarrier region based on a first subcarrier allocation pattern as downlink resources for sectors in a first service zone, and allocating subcarriers selected from the second subcarrier region based on a second subcarrier allocation pattern as downlink resources for sectors in a second service zone, performing one of a first operation and a second operation when a load for a downlink in one of the sectors is greater that a load for a downlink in a neighboring sector;

a plurality of mappers for receiving user data to be transmitted for the individual sectors, and mapping the user data to the subcarriers corresponding to the downlink resources allocated for the individual sectors;

a plurality of inverse fast Fourier transform (IFFT) blocks for transforming the user data mapped to the individual subcarriers into time-domain user signals; and a plurality of guard interval inserters for inserting a guard interval into each of the time-domain user signals, and transmitting the guard interval-inserted user signals via transmission antennas associated with the individual sectors;

wherein the sectors in the first service zone include non-neighboring sectors among the sectors, and the sectors in the second service zone include the remaining sectors, except for the sectors in the first service zone, wherein the first operation comprises releasing downlink resources allocated for the neighboring sector and then reallocating the released downlink resources as downlink resources for the one of the sectors, and the second operation comprises narrowing an antenna beam width forming the one of the sectors and widening an antenna beamwidth forming the neighboring sector.

10. The transmission apparatus of claim 9, wherein The first subcarrier region and the second subcarrier region are divided into a plurality of subcarrier bands having a predetermined size.

11. The transmission apparatus of claim 10, wherein the first subcarrier region and the second subcarrier region are uniformly distributed over the full subcarrier band.

12. The transmission apparatus of claim 9, wherein the subcarrier allocator allocates subcarriers selected from different subcarrier regions as downlink resources for sectors that are included in different cells but neighbor each other.

13. The transmission apparatus of claim 9, wherein the subcarrier allocator divides the first subcarrier region into subintervals mapped to sectors in the first service zone, and allocates subcarriers selected from the divided subintervals as uplink resources for the sectors in the first service zone.

14. The transmission apparatus of claim 13, wherein the subcarrier allocator divides the second subcarrier region into subintervals mapped to sectors in the second service zone, and allocates subcarriers selected from the divided subintervals as uplink resources for the sectors in the second service zone.

15. The transmission apparatus of claim 14, wherein when a load for an uplink in one of the sectors is greater than a load for an uplink in a neighboring sector, the subcarrier allocator releases uplink resources allocated for the neighboring sector and then reallocates the released uplink resources as uplink resources for the one of the sectors.

16. The transmission apparatus of claim 14, wherein when a load for an unlink in one of the sectors is greater than a load for an unlink in a neighboring sector, the subcarrier allocator narrows an antenna beamwidth forming the one of the sectors and widens an antenna beamwidth forming the neighboring sector.

* * * * *

UNITED STATES PATENT AND TRADEMARK OFFICE
CERTIFICATE OF CORRECTION

PATENT NO. : 7,593,420 B2  
APPLICATION NO. : 11/286728  
DATED : September 22, 2009  
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 951 days.

Signed and Sealed this

Twenty-first Day of September, 2010

David J. Kappos  
*Director of the United States Patent and Trademark Office*